US009254788B2

(12) United States Patent
Freytag

(10) Patent No.: US 9,254,788 B2
(45) Date of Patent: Feb. 9, 2016

(54) FOLDING REAR VIEW MIRRORS

(71) Applicant: AGCO International GmbH, Neuhausen am Rheinfall (CH)

(72) Inventor: Erich Freytag, Sachsenried (DE)

(73) Assignee: AGCO INTERNATIONAL GmbH, Neuhausen (CH)

( * ) Notice: Subject to any disclaimer, the term of this patent is extended or adjusted under 35 U.S.C. 154(b) by 255 days.

(21) Appl. No.: 14/084,018

(22) Filed: Nov. 19, 2013

(65) Prior Publication Data
US 2014/0139938 A1 May 22, 2014

(30) Foreign Application Priority Data
Nov. 19, 2012 (GB) .................................. 1220764.3

(51) Int. Cl.
B60R 1/06 (2006.01)
B60R 1/078 (2006.01)

(52) U.S. Cl.
CPC ............. *B60R 1/0605* (2013.01); *B60R 1/0607* (2013.01); *B60R 1/078* (2013.01)

(58) Field of Classification Search
CPC .................................. B60R 1/02; B60R 1/078
See application file for complete search history.

(56) References Cited

U.S. PATENT DOCUMENTS

| 3,031,929 A | 5/1962 | Prutzman, Jr. |
| 3,339,876 A * | 9/1967 | Kampa ................. B60R 1/0617 248/478 |
| 6,010,226 A * | 1/2000 | Gilbert .................... B60R 1/076 359/842 |
| 2003/0117729 A1 | 6/2003 | Foote |
| 2005/0105299 A1* | 5/2005 | Gilbert ................ B60Q 1/2665 362/494 |
| 2005/0213231 A1* | 9/2005 | Harrison, III .......... B60R 1/003 359/879 |
| 2008/0179485 A1 | 7/2008 | Yang |
| 2014/0139938 A1* | 5/2014 | Freytag ................... B60R 1/078 359/844 |

FOREIGN PATENT DOCUMENTS

DE 3938961 A1 5/1991
GB 1339123 11/1973

* cited by examiner

Primary Examiner — Jennifer L. Doak

(57) ABSTRACT

A vehicle folding rear view mirror support mechanism having first (15) and second (16) pivotally interconnected support arm means. A first end (15b1) of the first support arm means is pivoted on a mounting bracket (18) for attachment to the vehicle, a second end (15c1) of the first support arm means is pivotally connected with a first end (16b1) of the second support arm means, and a mirror mount (22) is pivotally connected to a second end (16c1) of the second support arm means. The first and second arm means (15, 16) are movable between a retracted reduced width position in which the two arm means are in a side by side substantially parallel relationship and an extended increased width position in which the two arm means are substantially end to end and the mirror mount (22) is supported at its maximum distance from the mounting bracket (18).

8 Claims, 9 Drawing Sheets

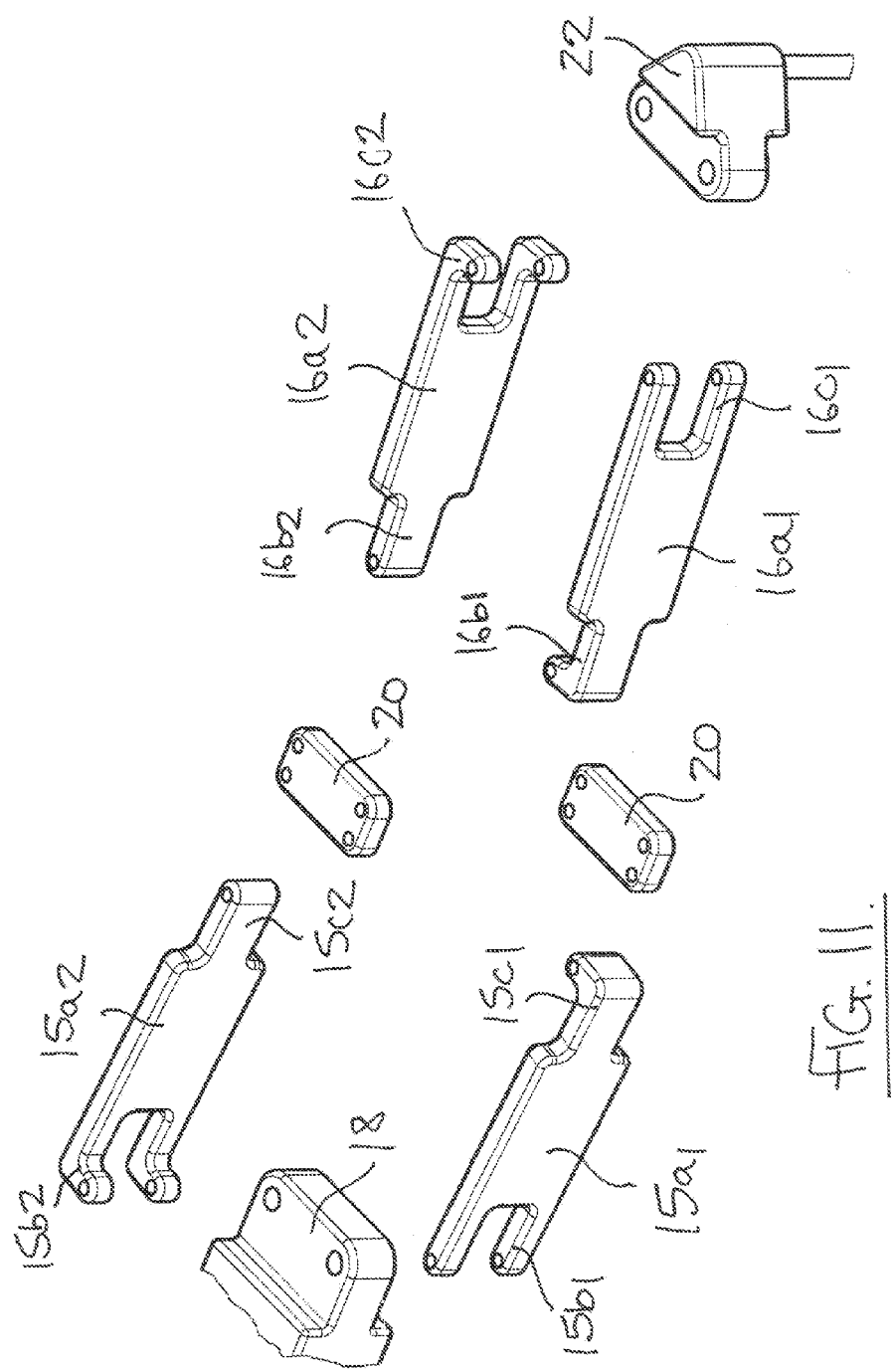

FOLDING REAR VIEW MIRRORS

BACKGROUND OF THE INVENTION

This invention relates to folding rear view mirrors for vehicles.

With vehicles such as agricultural or industrial tractors the variety of trailers, implements or attachments which may be drawn behind the tractor is very varied and this presents a problem in providing rear view mirrors which can be easily adjusted between the different width settings that are necessary to provide a clear rear view around the different trailers, implements or attachments which may be used.

One option is a telescoping arrangement as described, for example, in U.S. 2003/0117729, but such arrangements are not simple to adjust if not mechanised and may have penalties in terms of cost and component count. Simpler systems based on pivoting links, described in GB 1 339 123 and U.S. Pat. No. 3,031,929, allow a mirror mount to collapse inwards if an obstacle is encountered but do not support adjustment over a wide range of width settings whilst remaining visible to the user.

OVERVIEW OF THE INVENTION

It is an object of the present invention to provide an improved form of vehicle rear view mirror support mechanism which simply and efficiently meets the above wide variation of width settings required on a modern tractor or similar vehicle.

Thus according to the present invention there is provided a vehicle folding rear view mirror support mechanism comprising first and second pivotally interconnected support arm means, a first end of the first support arm means being pivoted on a mounting bracket for attachment to the vehicle, a second end of the first support arm means being pivotally connected with a first end of the second support arm means, and a mirror mount pivotally connected to a second end of the second support arm means, the first and second arm means being movable between a retracted reduced width position in which the two arm means are in a side by side substantially parallel relationship and an extended increased width position in which the two arm means are substantially end to end and the mirror mount is supported at its maximum distance from the mounting bracket, wherein the first and second arm means each comprises a pair of arms, the arms of each pair extending substantially parallel to each other at all times.

As will be described hereinafter, the arrangement of pairs of parallel arms may be used to maintain the position of a mirror along the longitudinal axis of a vehicle as the mirror moves in and out, giving a wide range of usable positions.

Each arm of a pair may be of an elongated L-shaped configuration such as to allow the first and second arm means to nest closely in their retracted side by side position.

The two arm means may be pivotally interconnected via connecting plates above and below the arm means.

All the arms may be of two basic shapes only and all the connecting plates may be of the same shape and size. This gives a particularly economical construction.

A mirror is supported from the mirror mount.

The first pair of arms may be connected to the second pair of arms by gear means so that pivoting of the first pair of arms relative to the mounting bracket pivots the second pair of arms relative to the first pair of arms.

A first motor means may act on the arm means to adjust the position of the mirror mount relative to the mounting bracket.

A second motor means may be provided to adjust the position of the mirror relative to the mirror mount.

Conveniently a vehicle may be provided with a pair of mirror support mechanism as described above secured to opposite sides of the vehicle, one mechanism being secured to the vehicle so that in the retracted position the arm means extend to the rear of the mounting bracket and the other mechanism being secured to the vehicle is so that in the retracted position the arm means extend to the front of the mounting bracket.

BRIEF DESCRIPTION OF THE DRAWINGS

One embodiment of the present invention, as applied to a folding support mechanism for an agricultural tractor, will now be described, by way of example only, with reference to the accompanying drawings in which:

FIG. 11 shows an exploded perspective view of the mirror support structure of FIG. 9.

DETAILED DESCRIPTION OF EXEMPLARY EMBODIMENTS

Figure 1:
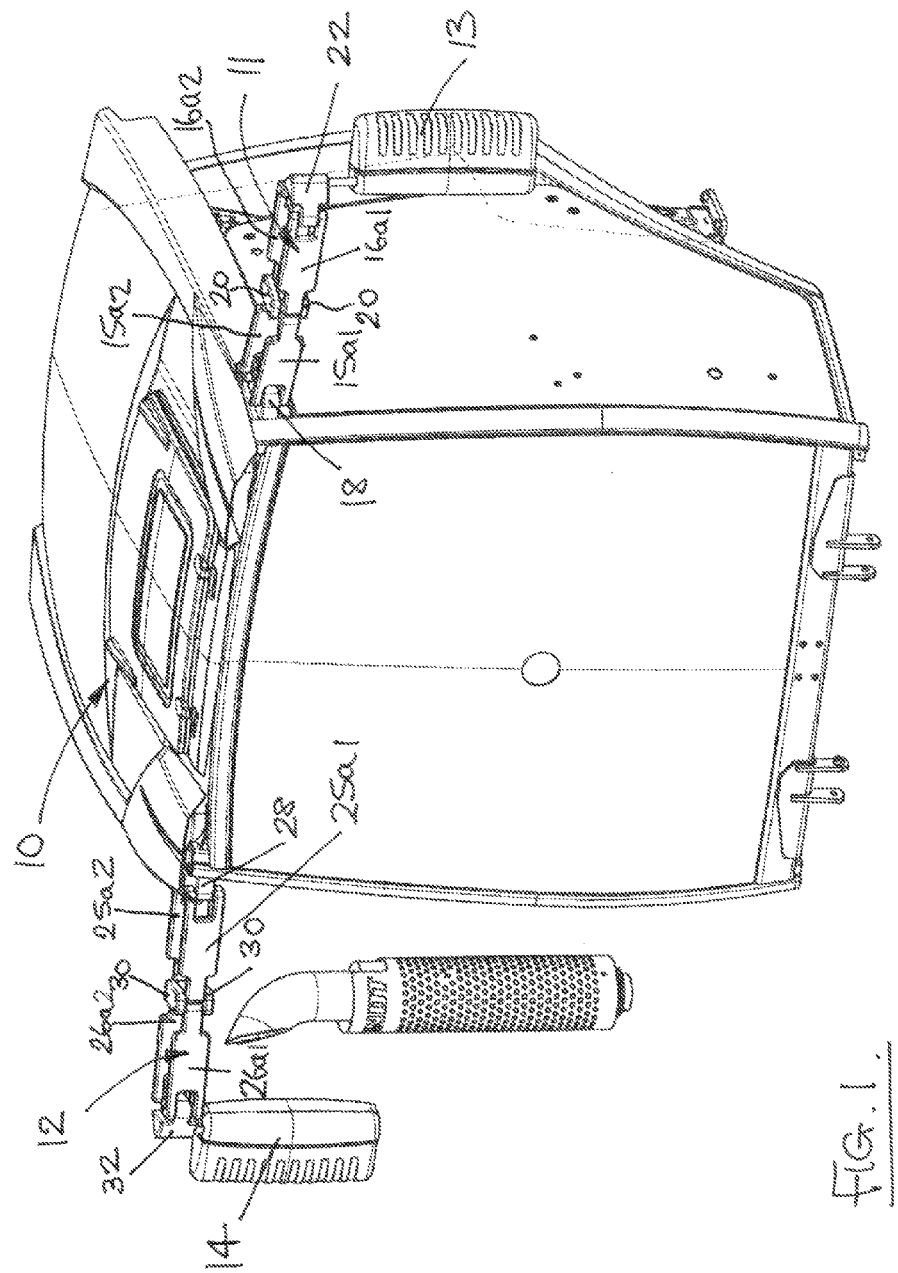
FIG. 1 shows a perspective view of the mirror support structure in its extended position.

Referring to the drawings, a tractor cab 10 is provided with left and right folding mirror support mechanisms 11 and 12 respectively which in turn carry left and right rear view mirrors 13 and 14. The support mechanism can be adjusted between the extended positions shown in FIG. 1 and the retracted positions shown in FIG. 5.

The left hand mirror support structure 11 (when considering the tractor in the driving direction) comprises first and second pivotally interconnected support arm means 15 and 16 which each comprise pairs of L-shaped arms 15a1,15a2 and 16a1,16a2 respectively. The forked first ends 15b1 and 15b2 of arms 15a1,15a2 are pivotally attached by pins 17 to a support bracket 18 which is secured to the cab. The second ends 15c1 and 15c2 of the first support arms 15a1, 15a2 are pivotally connected by pins 19 with connecting plates 20 above and below the arms on which the first ends 16b1 and 16b2 of second support arms 16a1,16a2 are mounted by pins 21. A mirror mount 22 is pivotally mounted on the second ends 16c1 and 16c2 of arms 16a1,16a2 via pins 23. The left mirror 13 is pivotally mounted on mount 22.

For ease of construction and economy the L-shaped arms 15a1 and 16a1 are identical and L-shaped arms 15a2 and 16a2 are identical.

Figure 2:
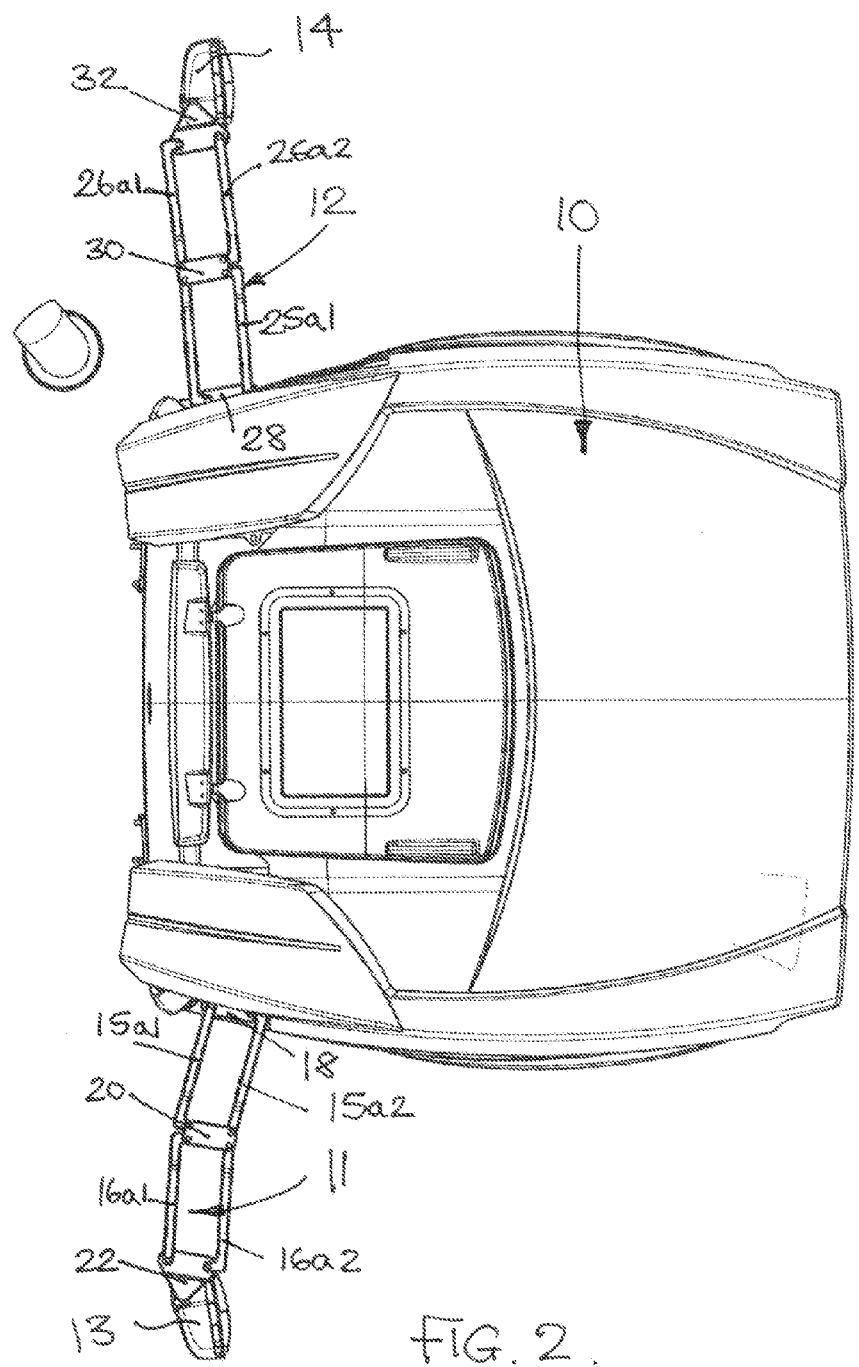
FIG. 2 shows a plan view of the mirror support structure of FIG. 1.
Figure 3:
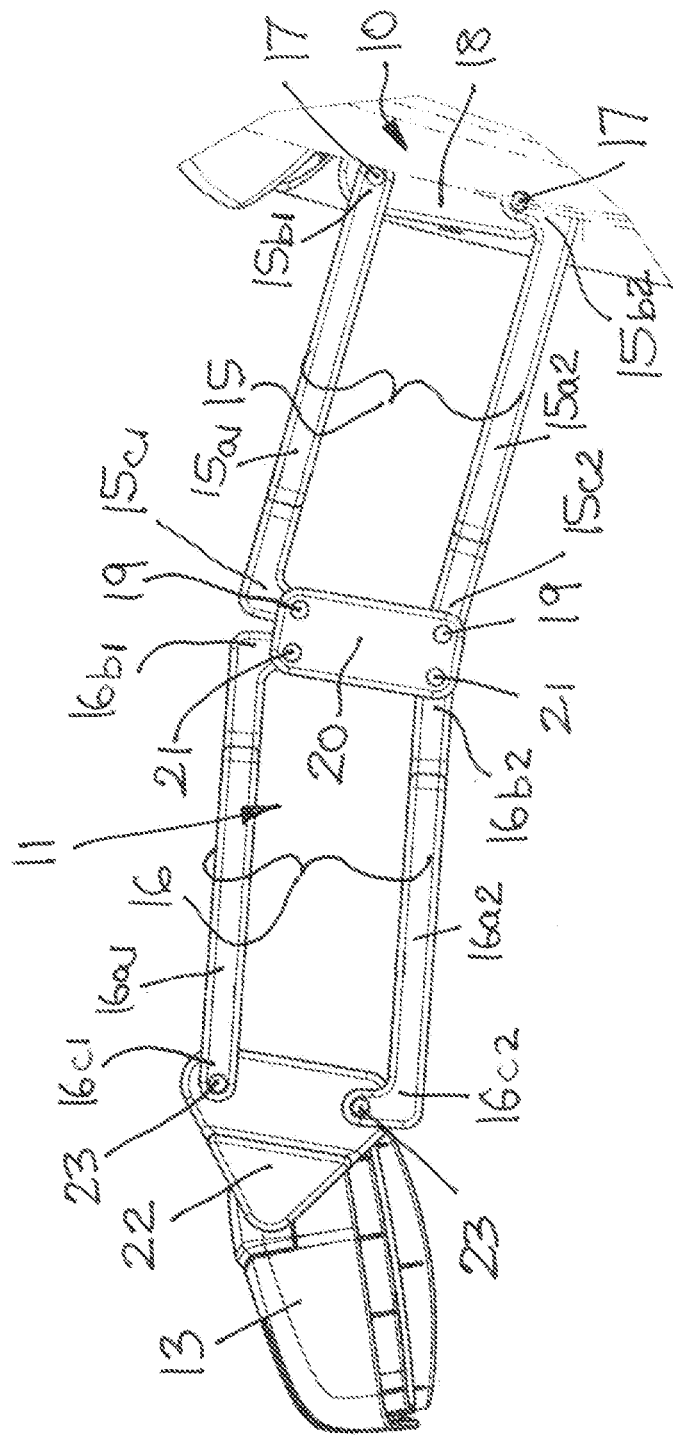
FIGS. 3 and 4 respectively show plan views of the left and right mirror support structures in their extended positions on a larger scale.
Figure 5:
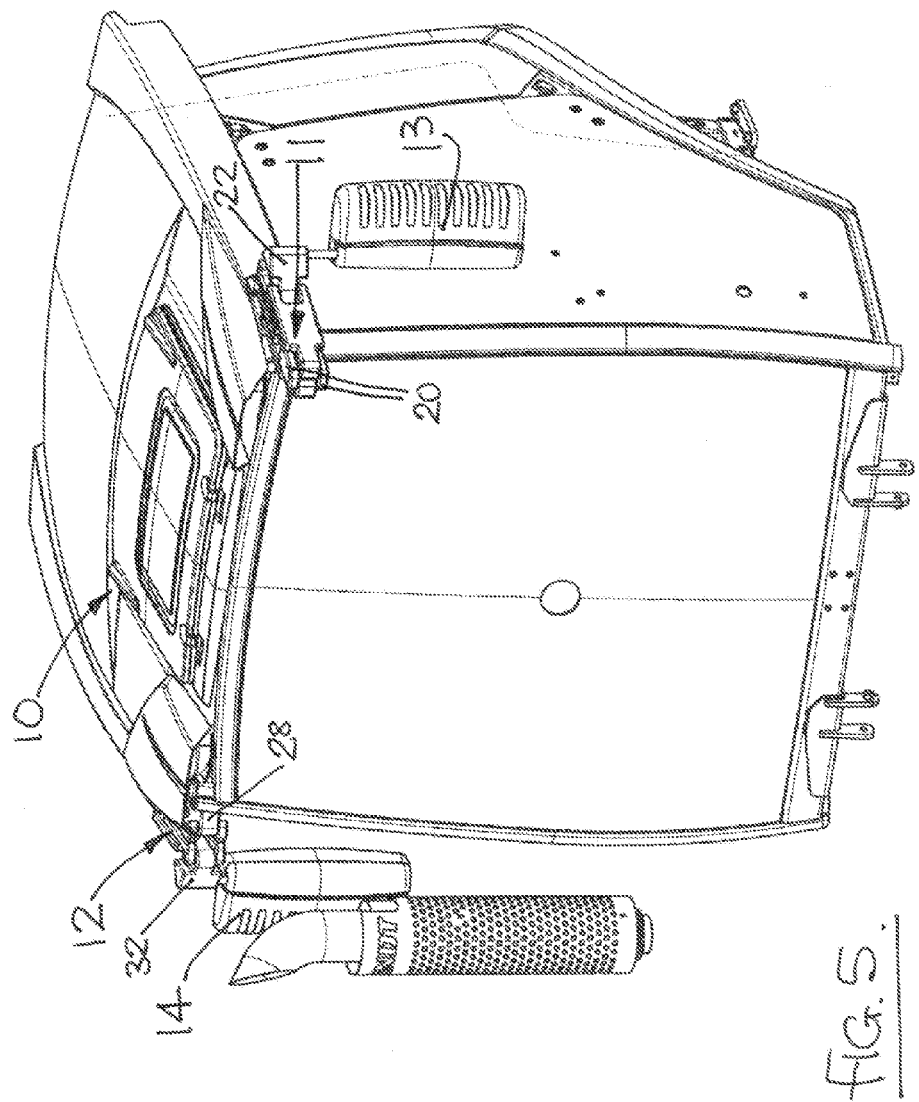
FIG. 5 shows a perspective view of the mirror support structure in its retracted position.
Figure 6:
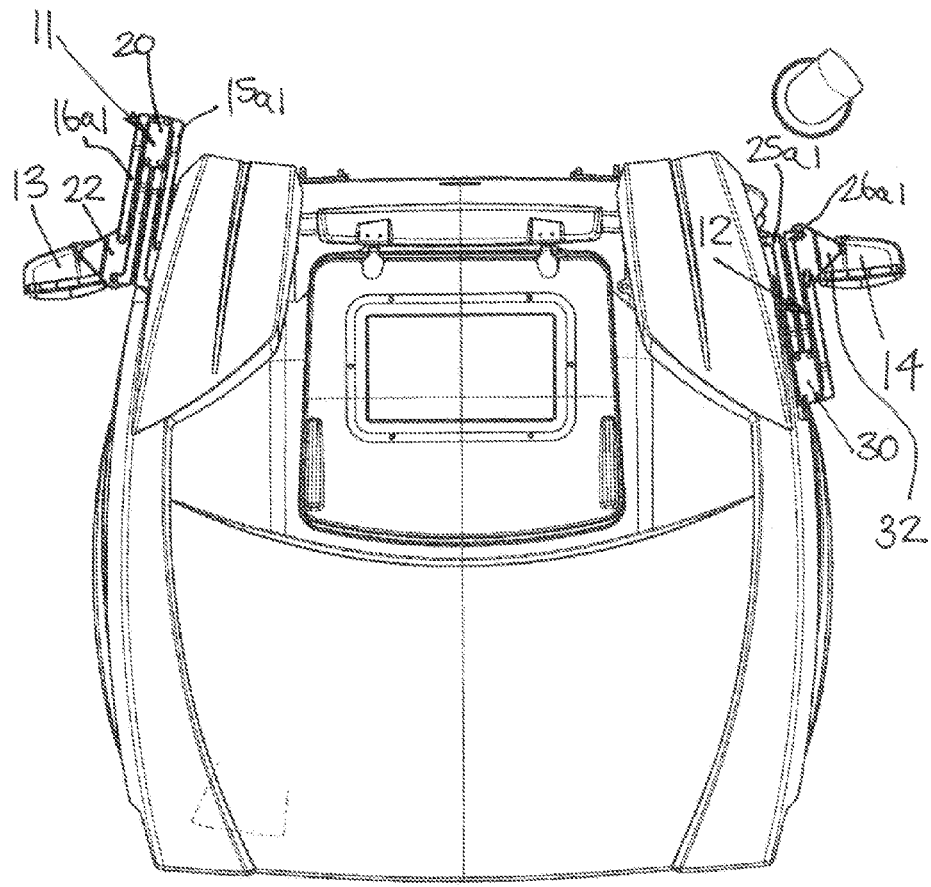
FIG. 6 shows a plan view of the mirror support structure of FIG. 5.
Figure 7:
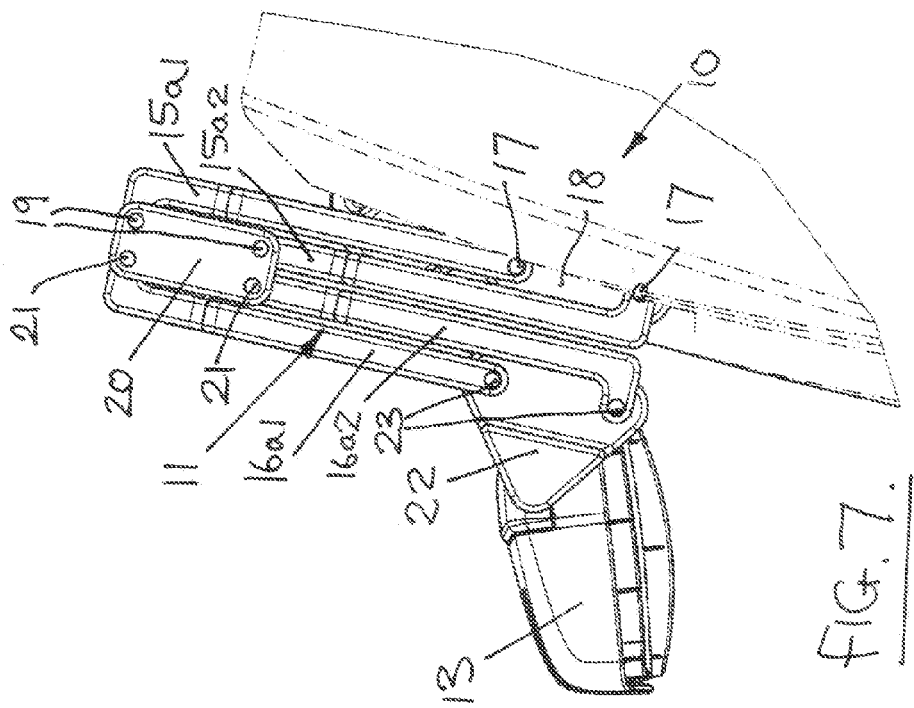
Figure 9:
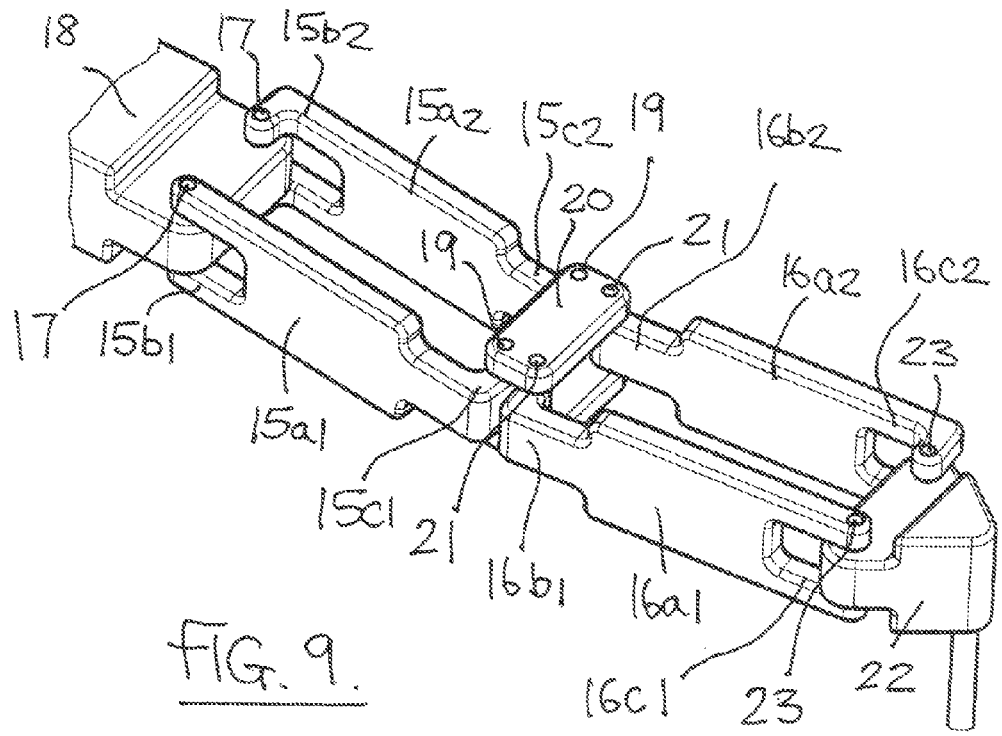
FIGS. 9 and 10 show perspective views of the left mirror support structure in its extended and retracted positions respectively.
Figure 10:
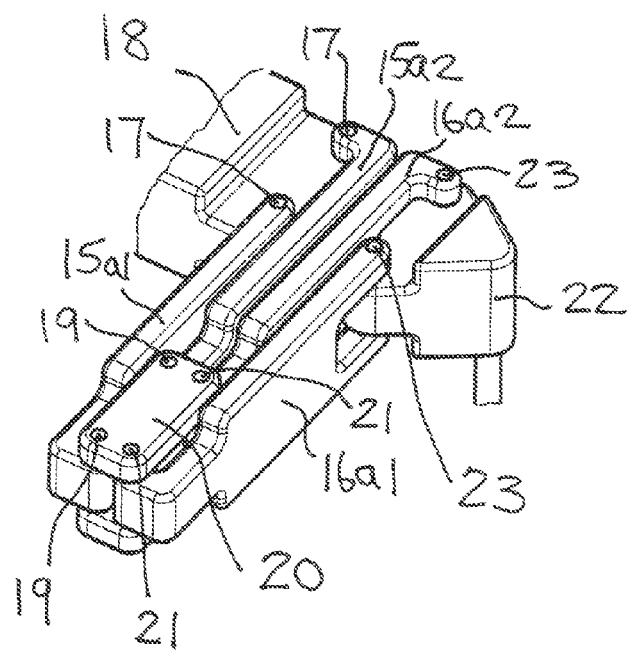

The arms 15a1,15a2 and 16a1,16a2 of the left hand support mechanism 11 are movable between an extended increased width position shown in FIGS. 1 to 3 and a retracted reduced width position shown in FIGS. 5 to 7. In the extended position the arms 15a1,16a1 and 15a2,16a2 extend in a substantially parallel end to end relationship whereas in the retracted position the arms 15a1,16a1 and 15a2,16a2 extend in a substantially parallel side by side closely nested relationship.

An electric motor (not shown) may be provided to adjust the position of the mirror mount 22 relative to the mounting bracket 18. In such an arrangement the end portion 15c1 of arm 15a1 may be connected via a gear wheel (not shown) with the end 16b1 of the arm 16a1 so that movement of arm 15a1 by the motor also moves arm 16a1. For a firmer drive end portions 15c2 and 16b2 may also be connected by a further gear wheel but this is not essential. If desired a further electric motor can be provided to adjust the position of the mirror 13 relative to the mirror mount 22 (if this motor is not provided the mirror is always in the same position unless adjusted manually).

Alternatively these adjustments of the arms and mirror can all be made manually.

Also other means may be provided to adjust the position of the mirror 13 and arms e.g. hydraulic or mechanical means.

Similarly the right hand mirror support mechanism 12 comprises first and second pivotally interconnected support arm means 25 and 26 which each comprise pairs of L-shaped arms 25a1,25a2 and 26a1,26a2 respectively. The forked first ends 25b1 and 25b2 of arms 25a1,25a2 are pivotally attached by pins 27 to a support bracket 28 which is secured to the cab. The second ends 25c1 and 25c2 of the first support arms 25a1,25a2 are pivotally connected by pins 29 with connecting plates 30 on which the first ends 26b1 and 26b2 of second support arms 26a1,26a2 are mounted by pins 31. A mirror mount 32 is pivotally mounted on the second ends 26c1 and 26c2 of arms 26a1,26a2 via pins 33. The right mirror 14 is pivotally mounted on mount 32.

For ease of construction and economy the L-shaped arms 25a1 and 26a1 are identical and arms 25a2 and 26a2 are identical. Also arms 15a1,16a1,25a2,26a2 are identical and arms 15a2,16a2,25a1,26a1 are identical. Also all the connecting plates 20 and 30 are identical. This significantly reduces the cost of the arrangement.

Figure 4:
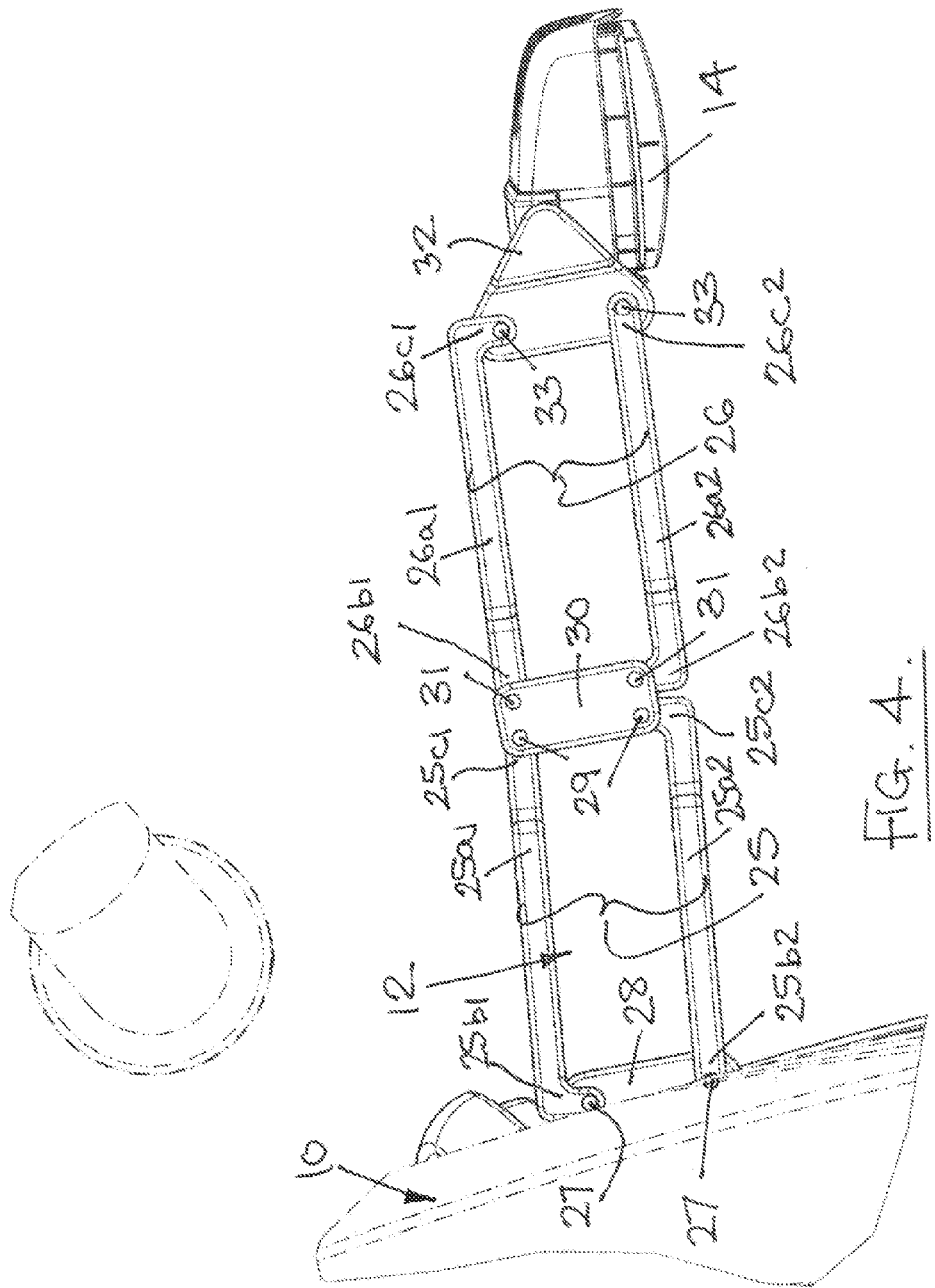
Figure 8:
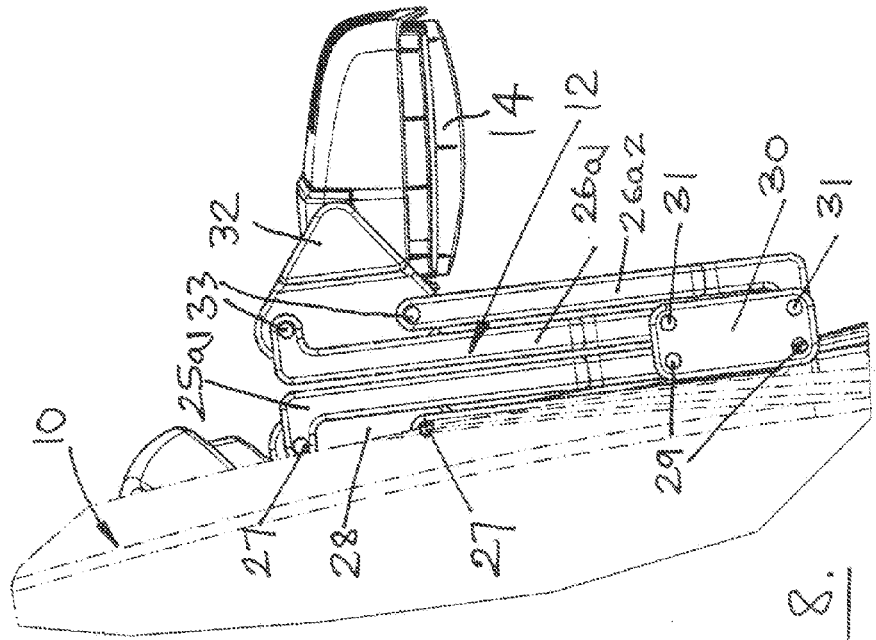
FIGS. 7 and 8 respectively show plan views of the left and right mirror support structures in their retracted positions on a larger scale.

Again the arms 25a1,25a2 and 26a1,26a2 of the right hand support mechanism 12 are movable between an extended increased width position shown in FIGS. 1, 2 and 4 and a retracted reduced width position shown in FIGS. 5, 6 and 8. Again in the extended position the arms 25a1,26a1 and 25a2,26a2 extend in a substantially parallel end to end relationship whereas in the retracted position the arms 25a1,26a1 and 25a2,226a2 extend in a substantially parallel side by side relationship.

Again an electric motor (not shown) may be provided to adjust the position of the mirror mount 32 relative to the mounting bracket 28. In such an arrangement the end portion 25c1 of arm 25a1 may be connected via a gear wheel (not shown) with the end 26b1 of the arm 26a1 so that movement of arm 25a1 by the motor also moves arm 26a1. For a firmer drive end portions 25c2 and 26b2 may also be connected by a further gear wheel but this is not essential. If desired a further electric motor can be provided to adjust the position of the mirror 14 relative to the mirror mount 32: if this motor is not provided the mirror is always in the same position unless adjusted manually.

Alternatively these adjustments of the arms and mirror can all be made manually or other means such as hydraulic or mechanical means can be used.

A can be seen from FIGS. 5 to 8, the mirror support mechanisms 11 and 12 are secured to the cab so that mechanism 11, when in its retracted position, extends to the front of its mounting bracket 18 to guarantee access to the cab door and the mechanism 12 extends to the rear of its mounting bracket 28 to keep the mirror away from the exhaust. This allows identical arm components to be used for each mechanism. The retracted position is also used as a parking position to give less width.

It is also possible to use only one first arm (e.g. 15a1) and only one second arm (e.g. 16a1) but then it is necessary to use two motors to adjust the position of the mirror mount (e.g. 22) relative to the mounting bracket (e.g. 18). In such an arrangement, because the parallelogram function is missing in the arms, a motor must act on each arm to adjust the position of the mirror mount (22, 32) relative to the mounting bracket (18, 28). Again in this arrangement a third motor can be used to adjust the position of the mirror (13, 14) relative to the mirror mount (22, 32).

The above folding mirror support mechanism allows the position of the rear view mirrors of an agricultural tractor to be easily adjusted between the different width settings that are necessary to provide a clear rear view around the different trailers, implements or attachments which may be connected to the tractor.

What is claimed is:

1. A vehicle folding rear view mirror support mechanism comprising first and second pivotally interconnected support arm means, a first end of the first support arm means being pivoted on a mounting bracket for attachment to the vehicle, a second end of the first support arm means being pivotally connected with a first end of the second support arm means, and a mirror mount pivotally connected to a second end of the second support arm means, the first and second arm means being movable between a retracted reduced width position in which the two arm means are in a side by side substantially parallel relationship and an extended increased width position in which the two arm means are substantially end to end and the mirror mount is supported at its maximum distance from the mounting bracket, characterised in that the first and second arm means each comprises a pair of arms, the arms of each pair extending substantially parallel to each other at all times.

2. A mechanism according to claim 1 in which each arm means is of an elongated L-shaped configuration to allow the arms means to nest closely in their retracted side by side position.

3. A mechanism according to claim 1 in which the two arm means are pivotally interconnected via connecting plates above and below the arm means.

4. A mechanism according to claim 1 in which a mirror is supported from the mirror mount.

5. A mechanism according to claim 1 in which the first pair of arms is connected to the second pair of arms by gear means so that pivoting of the first pair of arms relative to the mounting bracket pivots the second pair of arms relative to the first pair of arms.

6. A mechanism according to claim 1 in which a first motor means acts on the arm means to adjust the position of the mirror mount relative to the mounting bracket.

7. A mechanism according to claim 4, in which a second motor means is provided to adjust the position of the mirror relative to the mirror mount.

8. A vehicle provided with a pair of mirror support mechanisms according to claim 1 secured to opposite sides of the vehicle, one mechanism being secured to the vehicle such that in the retracted position the arm means extend to the rear of the mounting bracket and the other mechanism being secured to the vehicle such that in the refracted position the arm means extend to the front of the mounting bracket.

* * * * *